(12) United States Patent  
Clauer et al.

(10) Patent No.: US 6,412,331 B1  
(45) Date of Patent: Jul. 2, 2002

(54) SHOCK PRESSURE GAUGE FOR LASER PEENING APPARATUS

(75) Inventors: Allan H. Clauer, Worthington; Craig T. Walters; David F. Lahrman, both of Powell, all of OH (US)

(73) Assignee: LSP Technologies, Inc., Dublin, OH (US)

( * ) Notice: Subject to any disclaimer, the term of this patent is extended or adjusted under 35 U.S.C. 154(b) by 0 days.

(21) Appl. No.: 09/443,811

(22) Filed: Nov. 19, 1999

(51) Int. Cl.[7] ................................................. G01L 5/00
(52) U.S. Cl. ....................................................... 73/11.02
(58) Field of Search ............................. 73/11.02, 12.01, 73/763, 774, 804, 855, 862.381

(56) References Cited

U.S. PATENT DOCUMENTS 4,850,229 A * 7/1989 Phillips ....................... 73/756
5,492,447 A * 2/1996 Mannava et al. ............ 415/200
5,671,628 A * 9/1997 Halila et al. .................... 72/53
5,691,479 A * 11/1997 Krisch et al. .................. 73/756
5,951,790 A * 9/1999 Mannava et al. ............ 148/510
6,089,106 A * 7/2000 Patel et al. ............. 73/862.582
6,144,012 A * 11/2000 Dulaney et al. ........ 219/121.85

* cited by examiner

*Primary Examiner*—Max Noori  
(74) *Attorney, Agent, or Firm*—Randall J. Knuth

(57) ABSTRACT

An apparatus for measuring the strength of a pressure pulse created from a laser peening device. The apparatus is reusable, and includes a pressure-sensitive medium, a back-up disk, and a cap, all disposed within a housing having a removable lid. All components of the apparatus are replaceable, thereby allowing an operator to utilize the apparatus more than once despite the harsh environment of laser peening.

27 Claims, 2 Drawing Sheets

SHOCK PRESSURE GAUGE FOR LASER PEENING APPARATUS

This invention was made with United States Government support under Contract No. F33615-98-C-5150 awarded by the Department of the Air Force. The United States Government has certain rights to this invention.

BACKGROUND OF THE INVENTION

1. Field of the Invention.

The present invention relates to the use of coherent energy pulses, as from high powered pulse lasers, in the shock processing of solid material, and, more particularly, to a reusable gauge for measuring the strength of an energy pulse in a laser peening apparatus.

2. Description of the Related Art.

Laser shock peening is a process for improving the fatigue, hardness, and corrosion resistance properties of materials by focusing radiation on preselected surface areas of a workpiece. Shock peening the workpiece can avoid gross deformation, cracking, and spallation of the workpiece, and nonplanar workpieces can be shock processed without the need of elaborate and costly shock focusing schemes.

Laser peening, also referred to as laser shock processing, utilizes two overlays: a transparent overlay (usually water) and an opaque overlay, typically an oil-based, acrylic-based, or water-based, black paint. During processing, a laser beam is directed to pass through the water overlay and is absorbed by the black paint, causing a rapid plasma formation and vaporization of the paint surface and the generation of a high amplitude shock wave. The shock wave cold works the surface of the workpiece and creates compressive residual stresses, which provide an increase in fatigue properties of the part. A workpiece may be processed by producing a matrix of overlapping spots that cover the fatigue critical zone of the part.

It would be advantageous for maintaining control and consistency in the laser peening process to utilize a pressure gauge that would sense the pressure being applied by the laser to the workpiece. Because of the high pressure associated with the laser peening process, however, gauges currently utilized in laser peening devices are typically single-use gauges, and therefore, render a relatively expensive means of determining the strength of the created shock wave.

SUMMARY OF THE INVENTION

The present invention provides a method of gauging the strength of the laser-formed shock wave with a reusable, and therefore, cost efficient device. The invention comprises replaceable components, including a pressure sensitive medium, a housing for that medium including a screw-on ring to hold internal components in place, a cap for the pressure-sensitive medium, a backup disk, a momentum trap, and a spring.

In the invention, a housing is removably mated with a screw-on ring, and the pressure-sensing medium is disposed between the a back-up disk and a cap. The cap includes an external surface and an internal surface, the internal surface having a convex shape for ensuring intimate contact with the backup disc and the pressure-sensing medium.

It is an advantage of the present invention that components can easily be replaced in the gauge by opening the housing, replacing the necessary components, and assembling it back together. By this process, gauge components that wear at a faster rate than their cooperating components can be exchanged without disposing of the entire gauge.

It is a further advantage of the present invention that the gauge provides a low cost alternative to single use gauges. By providing replaceable gauge components, the invention allows a user to replace only damaged or worn out parts of the gauge, rather than the entire gauge, during the laser peening process.

The invention comprises, in one form thereof, a thick high-strength steel or ceramic back-up disk for backing up a pressure gauge medium, such as manganin. In the ceramic embodiment of the back-up disk, a circumscribing guard ring is provided for protecting the ceramic core.

A separate, thin metal disc or cap engages the back-up disk, thereby holding the pressure gauge medium in intimate contact between the back-up disk and the metal cap.

In the preferred embodiment of the invention, the pressure-gauge-engaging surface of the cap is shaped in a convex manner, so that it holds the pressure gauge medium in close registry with the back-up disk. The preferred embodiment of the invention is further defined to include alignment notches on both the cap and the housing to prevent relative rotation between the cap and pressure gauge medium, thereby avoiding damage to the pressure medium. Adequate contact is necessary for accurately reading the strength of the shock wave. Reading of the shock wave magnitude is accomplished by the cap receiving the shock wave and conducting the shock wave to the pressure gauge medium.

The preferred embodiment of the invention further comprises a momentum trap for attenuating and trapping the shock wave, thereby preventing undue damage to the shock pressure gauge system. Without the momentum trap a shock wave could continue to reverberate within the gauge, causing fracture and yielding a shorter life span for gauge components.

Additionally, a spring is provided between the momentum trap and the housing, for holding the gauge components firmly against the back-up disk. Also, after each firing of the laser, the spring returns the components to their original position.

BRIEF DESCRIPTION OF THE DRAWINGS

The above-mentioned and other features and advantages of this invention, and the manner of attaining them, will become more apparent, and the invention will be better understood, by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Laser shock processing is an effective method of increasing fatigue life in metals by treating fatigue critical regions.

The effects of laser shock processing on fatigue of welded specimens has been studied in great detail in "Shock Waves and High Strained Rate Phenomena in Metals" by A. H. Clauer, J. H. Holbrook and B. P. Fairand, Ed. by M. S. Meyers and L. E. Murr, Plenum Press, New York (1981), PP. 675–702.

For more thorough background in the prior history of laser shock processing and that of high power processing of engineered materials, reference can be made to U.S. Pat. Nos. 5,131,957 and 5,741,559, these patents explicitly hereby incorporated by reference.

Figure 1:
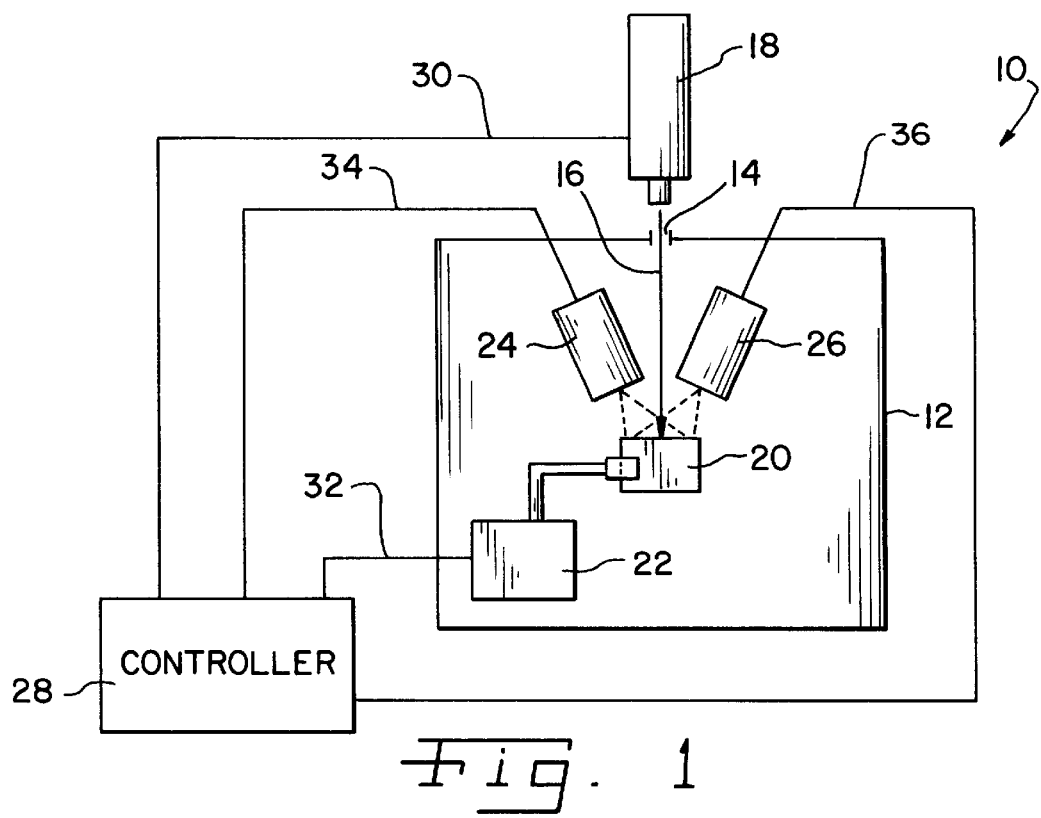
FIG. 1 is a diagrammatic view of one embodiment of a laser shock peening system.

Referring now to FIG. 1, a typical laser shock processing apparatus 10 comprises a target chamber 12 with an opening 14 for a laser beam 16 created by laser 18, a source of coherent energy. Laser 18, by way of example, may be a commercially available high power pulse laser system capable of delivering more than approximately 40 joules in 5 to 100 nanoseconds. The laser pulse length and focus of the laser beam may be adjusted as known in the art. As shown in FIG. 1, a workpiece 20 is held in position within target chamber 12 by means of a positioning mechanism 22.

Apparatus 10 includes a material applicator 24 for applying an energy absorbing material onto workpiece 20 to create a "coated" portion. Material applicator 24 may be that of a solenoid-operated painting station or other construction such as a jet spray or aerosol unit to provide a small coated area on workpiece 20. Apparatus 10 further includes a transparent overlay applicator 26 that applies a fluid or liquid transparent overlay to workpiece 20 over the portion coated by material applicator 24. Transparent overlay material should be substantially transparent to the radiation, water being the preferred overlay material.

Figure 2:
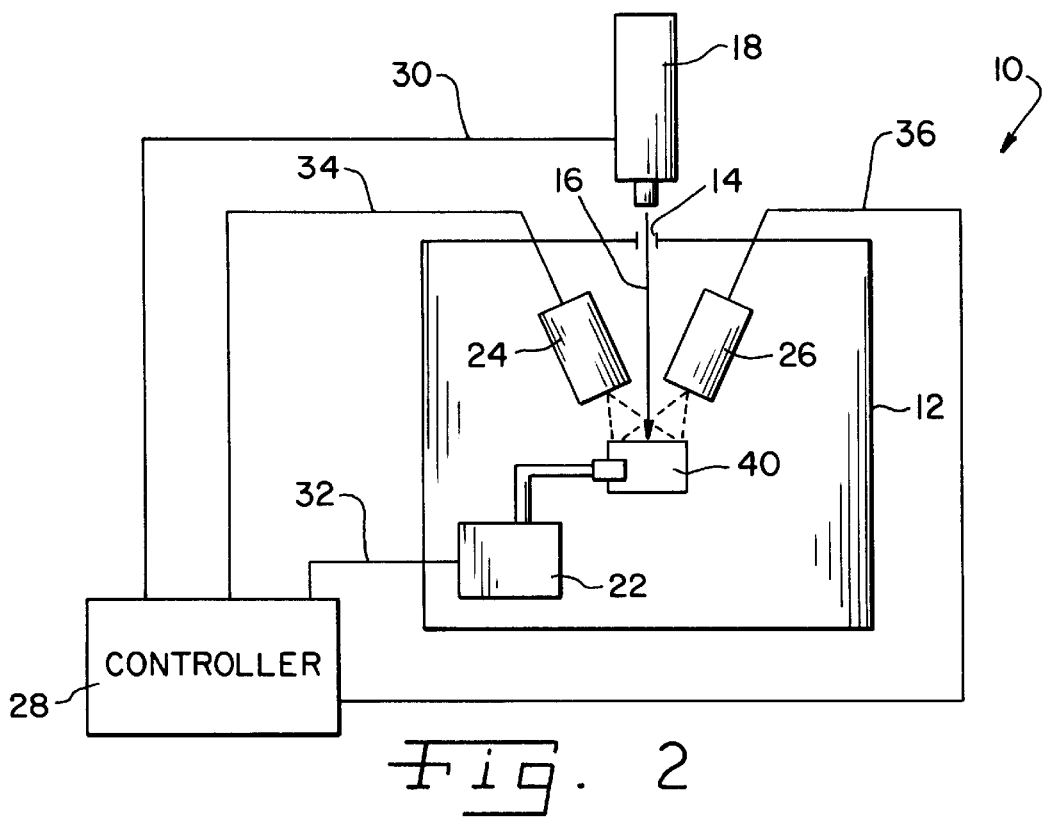
FIG. 2 is a diagrammatic view of the laser shock peening device of FIG. 1, incorporated with a shock pressure gauge of the present invention.
Figure 3:
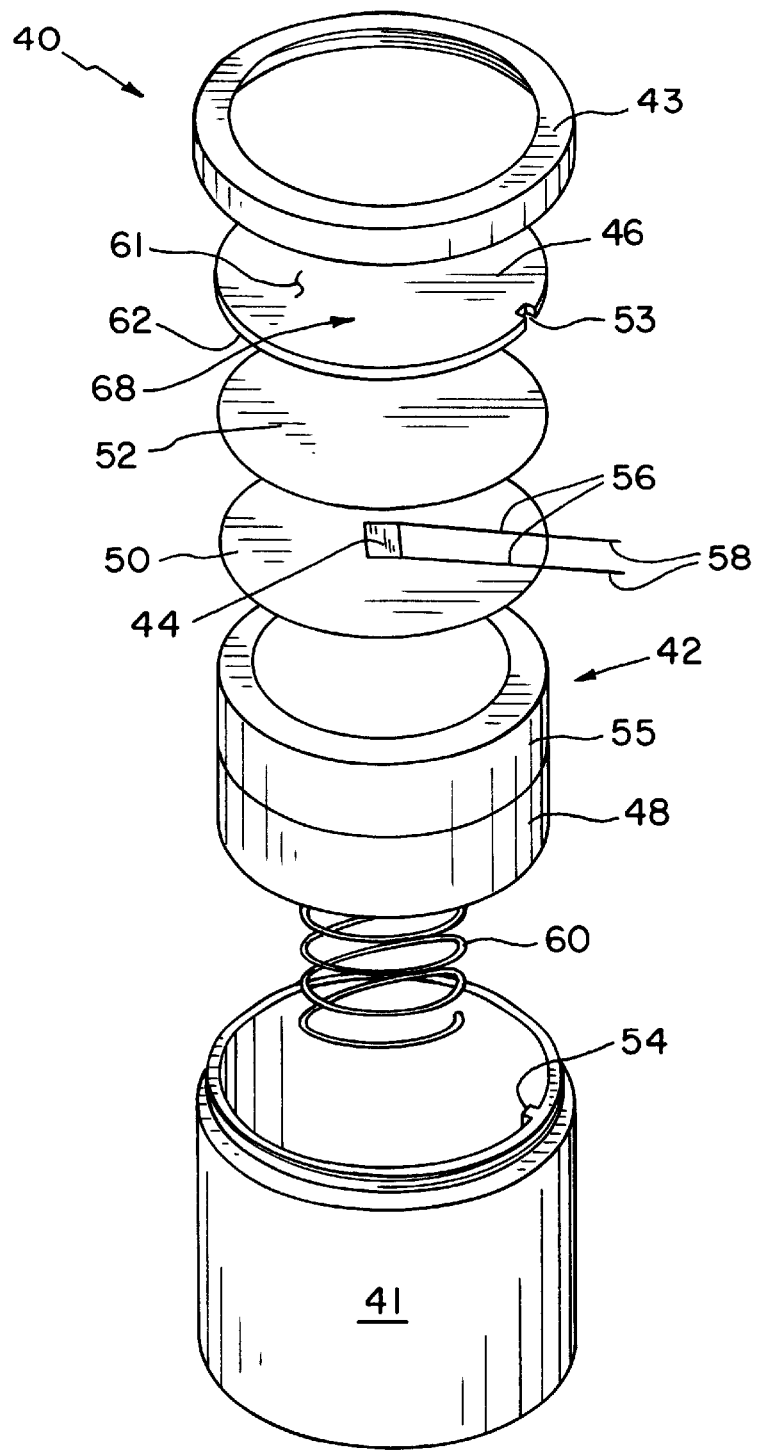
FIG. 3 is an exploded diagrammatic view of the preferred embodiment of the invention.

Referring now to FIGS. 2 and 3, the present invention pertains to a shock pressure gauge 40 positioned within target chamber 12 of the apparatus 10. As shown in FIG. 3, the preferred embodiment of a shock pressure gauge 40 comprises a housing 41 with a screw-on ring 43, a pressure gauge medium 44 disposed between a metal disc or cap 46 and a back-up disk 42, and a momentum trap 48.

In one embodiment of the invention, pressure gauge 40 further comprises a momentum trap 48 for dispersing the shock wave after it is passed through cap 46, pressure gauge medium 44, and back-up disk 42. Momentum trap 48 serves to reduce the momentum of the shock, thereby minimizing reverberation within the gauge and consequently preventing undue damage to back-up disk 42.

In another embodiment of the invention, a guard ring 55 is provided when back-up disk 42 is comprised of a ceramic material. Guard ring 55 circumscribes back-up disk 42 such that back-up disk 42 is in a spaced relationship from housing 41.

Pressure gauge 40 additionally comprises two thin layers of highly electrically resistant material, for providing electrical insulation around the pressure gauge medium 44. As illustrated in FIG. 3, insulation layer 50 insulates between pressure gauge medium 44 and back-up disk 42, and insulation layer 52 prevents electrical conduction between pressure gauge medium 44 and cap 46.

In accordance with the preferred embodiment of the present invention, pressure gauge 40 further comprises a spring 60 disposed between housing 41 and momentum trap 48, for holding momentum trap 48 in intimate contact with back up disk 42. Additionally, cap 46 is preferably shaped to include an external surface 61 and an internal surface 62, the internal surface 62 being convexly shaped for ensuring intimate contact between pressure gauge medium 44 and the surrounding elements.

Housing 41 is threadably mated with screw-on ring 43, such that all of the enclosed components of the pressure gauge 40 can be accessed. Additionally, housing 41 includes an alignment protrusion 54 for engaging with alignment notch 53 of cap 46. By providing alignment protrusion 54 and alignment notch 53, the invention prevents the rotation of cap 46, thereby preventing undue damage to pressure gauge medium 44. In some configurations, a guard ring 55 circumscribes back-up disk 42 to prevent tensile release waves from entering back-up disk 42 and possibly fracturing back-up disk 42 as it is supporting pressure gauge medium 44.

In the preferred embodiment of the invention, the pressure gauge medium is composed of a form of manganin, but it may also be composed of any piezoresistive material, including 86Cu-12Mn-2Ni, 83Cu-13Mn-4Ni, or ytterbium or piezoelectric materials such as PolyVinyDene Fluoride (PVDF). According to the preferred embodiment of the invention, the piezoresistive or piezoelectric material is approximately 1/10 of a micron to two millimeters thick.

Electrical attachments 56 provide current to and from pressure gauge medium 44, and more substantial leads 58 carry the current beyond the external portion of pressure gauge 40. Electrical attachments 56 are preferably composed of gold or copper, but other electrically conductive elements are suitable.

Insulation layers 50, 52, enveloping pressure gauge medium 44, are preferably each a thin layer of highly electrically resistant material, such as or $Al_2O_3$ or $SiO_2$. For piezoelectric materials this would be Teflon or a similar film or coating.

Back-up disk 42 is preferably a cylindrically shaped disk that is manufactured of a solid material selected from the group consisting of $B_4C$, $Al_2O_3$, $Si_3N_4$, SiC, $TiB_2$, Borosilicate, Borofloatā by Schott Glass, Pyrexa by Corning, and hardened steal such as AISI 4340 steel or Vasco 300. Disk 42 is of sufficient thickness to prevent spalling as the pressure pulse travels through the material, and of sufficient strength or hardness to minimize deformation of the surface.

Cap 46 is preferably manufactured of a spring steel, such as AISI 1070, or a high strength steel such as AerMet 100, Vasco 300, or AISI 4340, and is shaped such that it is in intimate contact with pressure gauge medium 44 and back-up disc 42. For piezoelectric material, the cap could consist of a polymeric material such as neoflon PTFE. In the preferred embodiment, the internal surface 62 of cap 46 is slightly convexly shaped, such that the concentric portion 68 of internal surface 62 protrudes slightly, forming a tighter engagement between cap 46 and back-up disk 42 on which pressure gauge medium 44 is located.

The present invention operates as follows. When laser shock processing apparatus 10 emits laser beam 16, shock pressure gauge 40 receives a pulse from laser beam 16. Importantly, gauge 40 is positioned within target chamber 12 in such a way as to place all of pressure gauge medium 44 within the cross sectional area of the path of laser beam 16.

When the pulse of coherent energy impacts cap 46, a shock wave is created in the cap 46. It is this shock wave that is useful in improving the fatigue life of workpiece 20, and therefore it is desirable to determine the strength of the shock wave. After being impacted, cap 46 conducts the shock wave to pressure gauge medium 44, where a piezoresistive material or piezoelectric, to be discussed further infra, determines the strength of the shock wave.

During operation, electricity is carried by leads 58 and electrical attachments 56 through pressure gauge medium 44. As a shock wave travels through pressure gauge 40, pressure gauge medium 44 responds to the shock wave by altering or impeding the flow of electricity such that the electrical current undergoes a measurable change. The difference in the flow of electricity is measured by an external logic controller circuit or microchip, which converts the measurements into pressure readings. Under pressure, piezoresistive materials change resistance, and therefore modify the voltage at constant current, and piezoelectric materials emit current flow.

As noted above, the advantage of the present invention is that any component of the pressure gauge 40 may be replaced individually, without disposal of the entire pressure gauge 40. This feature is particularly important in the laser shock processing environment because of the high amplitude of the shock waves.

The invention is utilized without a workpiece, or as a sample workpiece, as detailed below. Utilizing the invention without a workpiece, an operator places pressure gauge 40 in the path of laser beam 16, such that the surface area of pressure gauge medium 44 is within the perimeter of the laser beam 16. Laser beam 16 is activated, and a resulting pressure reading is sent to a logic controller or chip.

Alternately, an operator can utilize the invention as a sample workpiece, subjecting cap 46 to an energy-absorbing coating dispensed by material applicator 24 (FIG. 1), and a transparent overlay dispensed by transparent overlay applicator 26. Finally, laser beam 16 is activated, and cap 46 is subjected to a high amplitude shock wave much like a workpiece would have been subjected, transferring the shock wave to the pressure gauge medium 44 for pressure determinations.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A shock pressure gauge for measuring applied pressure in a laser shock peening device, said gauge comprising:
    a back-up disk;
    a cap with an external surface and an internal surface, said internal surface facing said back-up disk, said gauge being operatively arranged to enable operative laser energy communication from said laser shock peening device to said cap; and
    a pressure-sensing element disposed between said back-up disk and said cap.

2. The gauge of claim 1, further comprising a first electrically insulating layer disposed between said pressure-sensing element and said back-up disk, and a second electrically insulating layer disposed between said pressure-sensing element and said cap.

3. The gauge of claim 1, wherein said pressure-sensing element is one elected from the group including piezoresistive and piezoelectric.

4. The gauge of claim 1, wherein said internal surface of said cap is convexly shaped for ensuring intimate contact of said pressure-sensing element between said internal surface of said cap and said back-up disk.

5. The gauge of claim 1, further comprising a momentum trap coupled to said back-up disk, said momentum trap minimizing the shock wave activity associated with operation of said laser shock peening device in conjunction with said gauge.

6. The gauge of claim 1, further comprising a housing with a lid, said housing containing said back-up disk, said cap, and said pressure-sensing element.

7. The gauge of claim 6, wherein said lid threadably engages said housing.

8. The gauge of claim 6, further comprising a spring and a momentum trap operatively coupled to said back-up disk, said spring being disposed between said housing and said momentum trap for maintaining positioning pressure against said back-up disk.

9. The gauge of claim 6, wherein said cap and said housing include a set of cooperating notches for aligning said cap with said housing.

10. An instantaneous pressure meter for determining applied pressure for use with a laser shock processing device, said meter comprising:
    a housing having a base and a removably interlocking lid;
    a target element housed by said housing, said meter being operatively arranged to enable operative laser energy communication from said laser shock peening device to said target element; and
    a pressure-sensing element disposed between said base and said target element.

11. The meter of claim 10, further comprising a momentum trap disposed between said base and said pressure-sensing element, said momentum trap minimizing the shock effects of the laser shock processing device.

12. The meter of claim 10, wherein said target element further comprising a cap disposed between said lid and said pressure-sensing element.

13. The meter of claim 12, wherein said cap includes an interior surface and an exterior surface, said interior surface forming a convex shape for maintaining intimate contact with said pressure-sensing element.

14. The meter of claim 10, further comprising a first and second electrically insulating layer, for enveloping said pressure-sensing element.

15. The meter of claim 10, wherein said pressure-sensing element includes electrical leads for conducting electrical impulses from said pressure-sensing element.

16. A shock pressure gauge for use with a laser shock peening device, said gauge comprising:
    a housing having a base and an interlocking lid;
    a piezoresistive element disposed between said base and said lid, said element providing varying resistance to electricity responsive to pressures applied to said element;
    a first insulating film between said base and said element;
    a second insulating film between said lid and said element;
    a back-up disk disposed between said base and said first insulating film;
    a momentum trap positioned adjacent to said back-up disk; and
    a cap disposed between said lid and said second insulating film, said gauge being operatively arranged to enable operative laser energy communication from said laser shock opening device to said cap.

17. The gauge of claim 16, wherein said piezoresistive element is composed of a material selected from the group consisting of manganin, ytterbium, 86Cu-12Mn-2Ni, and 83Cu-13Mn-4Ni.

18. The gauge of claim 16, wherein said base is composed of a material selected from the group consisting of $B_4C$, $Al_2O_3$, $Si_3N_4$, SiC, $TiB_2$, Borosilicate, Borofloatä by Schott Glass, Pyrexä by Corning, and high strength steel.

19. The gauge of claim 16, wherein said cap is composed of a material selected from the group consisting of AISI 1070, AerMet 100, Vasco 300, and AISI 4340.

20. A shock pressure gauge for measuring applied pressure for use with a laser shock peening device, said gauge comprising:
- a first means, responsive to laser energy operatively applied thereto by said laser shock peening device, for operatively generating pressure energy activity;
- a back-up disk; and
- a pressure-sensing element disposed between said first means and said back-up disk.

21. The gauge of claim 20, wherein said first means further comprising a cap disposed adjacent said pressure-sensing element.

22. The gauge of claim 20, further comprising a momentum trap coupled to said back-up disk, said momentum trap minimizing the shock wave activity associated with operation of said laser shock peening device in conjunction with said gauge.

23. The gauge of claim 20, wherein said back-up disk is comprised of a ceramic material.

24. The gauge of claim 23, further comprising a guard ring concentrically disposed around said back-up disk.

25. The gauge of claim 20, wherein said pressure-sensing element is one selected from the group including piezoresistive and piezoelectric.

26. The gauge of claim 20, further comprising an insulating layer for enveloping said pressure-sensing element.

27. The gauge of claim 20, further comprising a housing having a detachable lid, said housing removably containing the components of said gauge.

* * * * *

UNITED STATES PATENT AND TRADEMARK OFFICE
CERTIFICATE OF CORRECTION

PATENT NO.   : 6,412,331 B1
DATED        : July 2, 2002
INVENTOR(S)  : Allan H. Clauer, Craig T. Walters and David F. Lahrman It is certified that error appears in the above-identified patent and that said Letters Patent is hereby corrected as shown below:

<u>Column 6,</u>
Line 63, "opening" should be replaced with -- peening. --

Signed and Sealed this

Fourteenth Day of January, 2003

JAMES E. ROGAN
*Director of the United States Patent and Trademark Office*